(12) United States Patent
Han et al.

(10) Patent No.: US 8,956,764 B2
(45) Date of Patent: Feb. 17, 2015

(54) ELECTRODE PLATE, SECONDARY BATTERY HAVING THE SAME, AND MANUFACTURING METHOD FOR THE ELECTRODE PLATE

(75) Inventors: Manseok Han, Yongin-si (KR); Jongki Lee, Yongin-si (KR); Taesik Kim, Yongin-si (KR); Byungjoo Chung, Yongin-si (KR); Juhee Sohn, Yongin-si (KR); Seonggi Choo, Yongin-si (KR); Kyun Lim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 151 days.

(21) Appl. No.: 13/585,197

(22) Filed: Aug. 14, 2012

(65) Prior Publication Data
US 2013/0302670 A1    Nov. 14, 2013

(30) Foreign Application Priority Data

May 8, 2012    (KR) .......................... 10-2012-0048475

(51) Int. Cl.
*H01M 4/70*    (2006.01)
*H01M 2/02*    (2006.01)
*H01M 4/74*    (2006.01)

(52) U.S. Cl.
CPC .............. *H01M 2/0235* (2013.01); *H01M 4/74* (2013.01)
USPC ............ 429/241; 429/233; 429/235; 429/236

(58) Field of Classification Search
CPC ...... H01M 4/74; H01M 2/0235; H01M 4/404
See application file for complete search history.

(56) References Cited

U.S. PATENT DOCUMENTS

| 2004/0191622 | A1* | 9/2004 | Han et al. ...................... 429/181 |
| 2006/0204839 | A1* | 9/2006 | Richards et al. ............... 429/137 |
| 2011/0052972 | A1* | 3/2011 | Sohn ............................. 429/161 |

FOREIGN PATENT DOCUMENTS

| JP | 2000-113892 A | 4/2000 |
| JP | 2010-272427 A | 12/2010 |
| KR | 10-2011-0001845 A | 1/2011 |
| KR | 10-2011-0001846 A | 1/2011 |

* cited by examiner

*Primary Examiner* — Ula C. Ruddock
*Assistant Examiner* — Scott J Chmielecki
(74) *Attorney, Agent, or Firm* — Lee & Morse, P.C.

(57) ABSTRACT

An electrode plate includes a current collector, the current collector being made of metal and having a 3-dimensional mesh structure, and an active material portion including an active material, the active material portion being inserted into a vacant space in the current collector and coated on top and bottom surfaces of the current collector.

16 Claims, 9 Drawing Sheets

ELECTRODE PLATE, SECONDARY BATTERY HAVING THE SAME, AND MANUFACTURING METHOD FOR THE ELECTRODE PLATE

CROSS-REFERENCE TO RELATED APPLICATION

This application claims priority under 35 U.S.C. §119 to Korean Patent Application No. 10-2012-0048475, filed on May 8, 2012, in the Korean Intellectual Property Office, and entitled: "Electrode plate, Secondary Battery having the same, and Manufacturing Method for the Electrode Plate," the disclosure of which is incorporated herein in its entirety by reference.

BACKGROUND

Embodiments relate to an electrode plate, a secondary battery having the same, and a manufacturing method for the electrode plate.

SUMMARY

Embodiments are directed to an electrode plate including a current collector, the current collector being made of metal and having a 3-dimensional mesh structure, and an active material portion including an active material, the active material portion being inserted into a vacant space in the current collector and coated on top and bottom surfaces of the current collector.

The current collector may include at least one selected from a plurality of metal bases, each having a 2-dimensional mesh structure, the plurality of metal bases being stacked in a juxtaposed manner to provide the 3-dimensional mesh structure, and a single metal base having a 2-dimensional mesh structure that is folded one or more times to provide the 3-dimensional mesh structure.

A surface of the single metal base or a surface of at least one of the plurality of metal bases may include an aluminum oxide portion having pores.

An average diameter of the pores may be in a range of 50 to 100 nm. An average depth of the pores may be in a range of $1/500$ to $1/100$ of a thickness of the single metal base or the at least one of the plurality of metal bases.

A thickness of the current collector may be 15 to 50% of a total thickness of the electrode plate.

Embodiments are also directed to a secondary battery including a first electrode plate, a second electrode plate, and an electrolyte. The first electrode plate includes a first current collector, the first current collector being made of metal and having a 3-dimensional mesh structure, and a first active material portion including an active material, the first active material portion being inserted into a vacant space in the first current collector and coated on top and bottom surfaces of the first current collector, and the second electrode plate includes a second current collector, the second current collector being made of metal and having a 3-dimensional mesh structure, and a second active material portion including a second active material, the second active material portion being inserted into a vacant space in the second current collector and coated on top and bottom surfaces of the second current collector.

Each of the first current collector and the second current collector may include at least one selected from a plurality of metal bases each having a 2-dimensional mesh structure, the plurality of metal bases being stacked in a juxtaposed manner, and a single metal base having a 2-dimensional mesh structure that is folded one or more times to provide the 3-dimensional mesh structure.

A surface of the single metal base or a surface of at least one of the plurality of metal bases of the first current collector may include an aluminum oxide portion having pores.

An average diameter of the pores may be in a range of 50 to 100 nm. An average depth of the pores may be in a range of $1/500$ to $1/100$ of a thickness of the single metal base or the at least one of the plurality of metal bases.

A thickness of the first current collector may be 15 to 50% of a total thickness of the first electrode plate. A thickness of the second current collector may be 15 to 50% of a total thickness of the second electrode plate.

Embodiments are also directed to a method of manufacturing an electrode plate, including forming a current collector, the current collector being made of metal and having a 3-dimensional mesh structure, and forming an active material portion including an active material, the active material portion being inserted into a vacant space in the current collector and coated on top and bottom surfaces of the current collector.

The forming of the current collector may include at least one selected from stacking a plurality of metal bases, each having a 2-dimensional mesh structure, in a juxtaposed manner to provide the 3-dimensional mesh structure, and folding a single metal base having a 2-dimensional mesh structure one or more times to provide the 3-dimensional mesh structure.

The forming of the current collector may further include performing an anodic aluminum oxide (AAO) template treatment on a surface of the single metal base or the at least one of the plurality of metal bases of the current collector to form an aluminum oxide portion having pores, the pores having an diameter in a range of 50 to 100 nm, and the pores having an average depth in a range of $1/500$ to $1/100$ a thickness of the single metal base or the at least one of the plurality of metal bases.

The method may further include pressing the electrode plate after the forming of the active material portion, wherein the pressing is performed to provide a thickness of the current collector of 15 to 50% of a total thickness of the electrode plate.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope thereof to those skilled in the art.

In the drawing figures, the dimensions of layers and regions may be exaggerated for clarity of illustration. Like reference numerals refer to like elements throughout.

Hereinafter, an electrode plate according to an embodiment will be described in detail. In the following description, a first electrode plate may be, for example, a positive electrode plate.

Figure 1A:
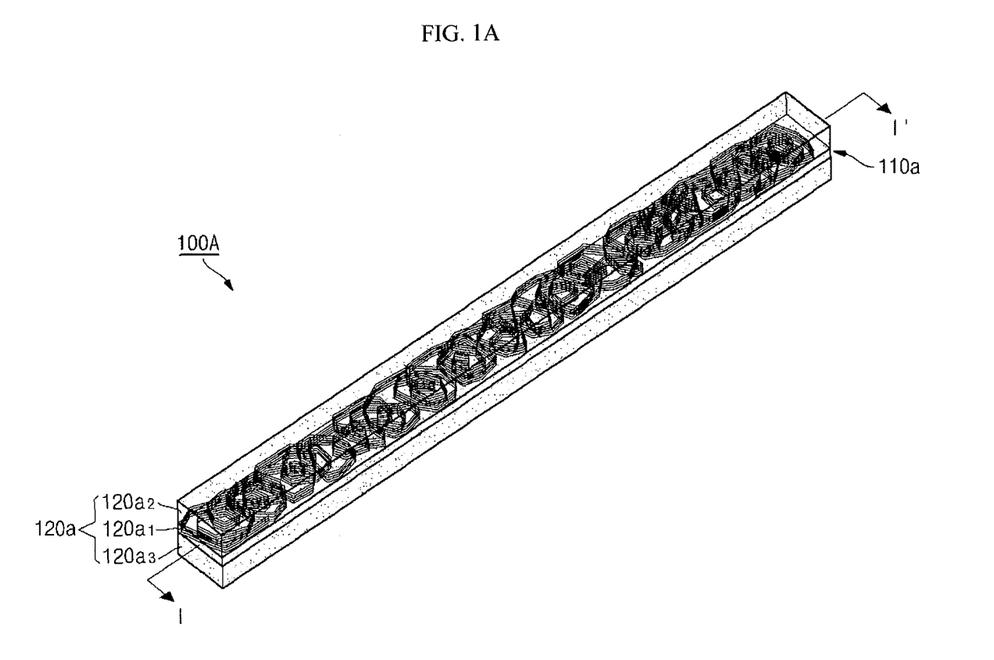
FIG. 1A illustrates a perspective view of a first electrode plate according to an embodiment.
Figure 1B:
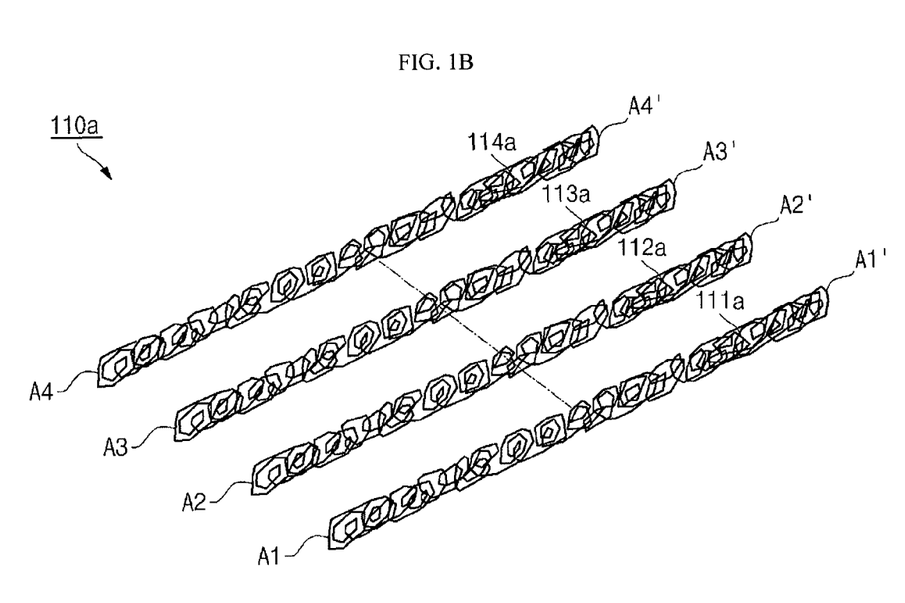
FIG. 1B illustrates an example of forming a first current collector according to the embodiment of FIG. 1A.
Figure 1C:
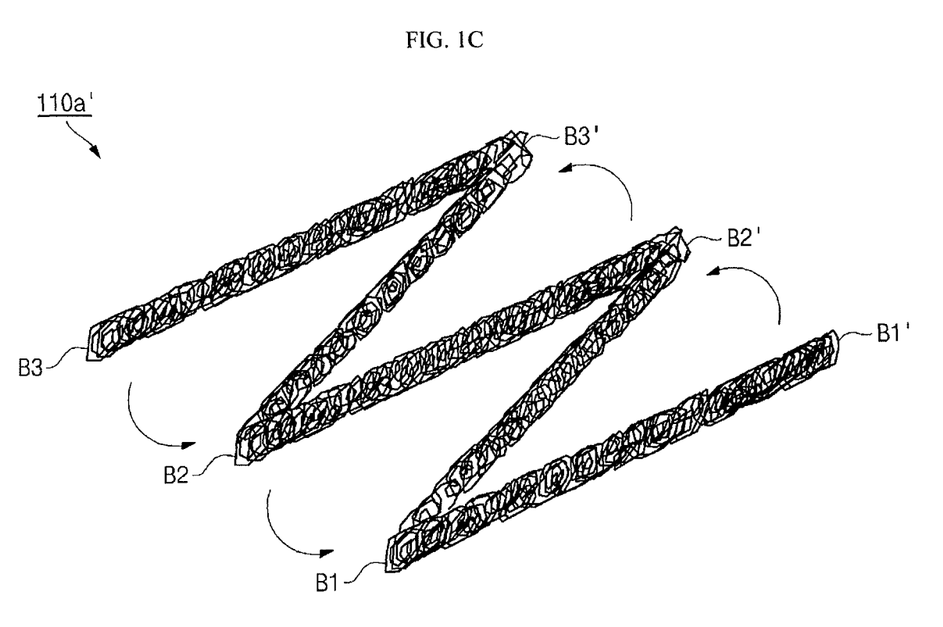
FIG. 1C illustrates another example of forming the first current collector according to the embodiment of FIG. 1A.
Figure 1D:
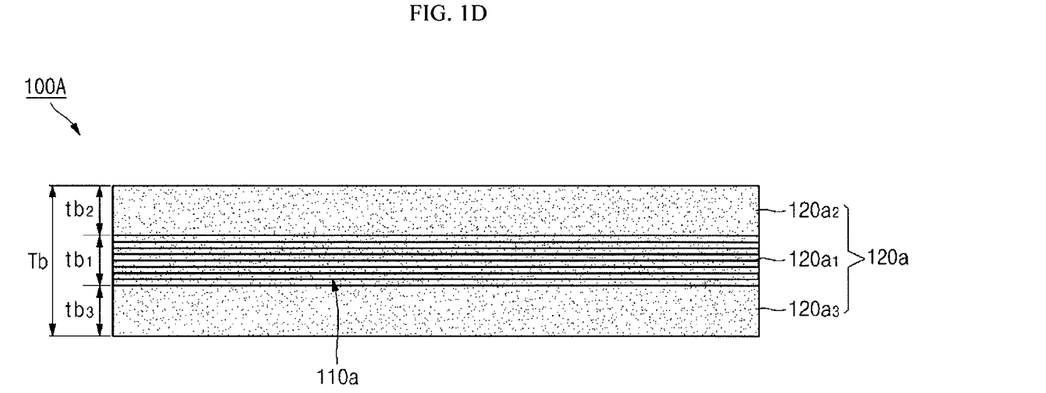
FIG. 1D illustrates a cross-sectional view of the first electrode plate taken along the line I-I' of FIG. 1A.

FIG. 1A is a perspective view of a first electrode plate 100A according to an embodiment, FIG. 1B illustrates an example of forming a first current collector 110a according to the embodiment of FIG. 1A, FIG. 1C illustrates another example of forming the first current collector 110a according to the embodiment of FIG. 1A, and FIG. 1D is a cross-sectional view of the first electrode plate 100A taken along the line I-I' of FIG. 1A.

Referring to FIGS. 1A to 1D, the first electrode plate 100A includes a first current collector 110a and a first active material portion 120a.

As shown in FIG. 1B, the first current collector 110a may have a 3-dimensional mesh structure such that first metal bases 111a, 112a, 113a and 114a each having a 2-dimensional mesh structure are stacked in a juxtaposed manner. Herein, the term "2-dimensional mesh structure" may refer to a mesh structure in which a thickness is negligible in comparison to a length and width of the mesh structure. Here, each of the first metal bases 111a, 112a, 113a and 114a may be a 2-dimensional thin film having thin and long wires intertwined in a mesh configuration. The first current collector 110a may be constructed to have a constant thickness such that the first metal bases 111a, 112a, 113a and 114a each having a 2-dimensional mesh structure may be stacked in a juxtaposed manner. A thickness of each of the first metal bases 111a, 112a, 113a and 114a may be in a range of approximately 10 to 50 μm, as an example.

The first metal bases 111a, 112a, 113a and 114a may be coupled to each other by welding ends thereof corresponding to each other. For example, first ends A1, A2, A3 and A4 of the first metal bases 111a, 112a, 113a and 114a may be welded to each other, and second ends A1', A2', A3' and A4' of the first metal bases 111a, 112a, 113a and 114a may be welded to each other.

In another implementation, as shown in FIG. 1C, a first current collector 110a' may be configured such that a single metal base having a 2-dimensional mesh structure is folded, for example, or more times. Ends of the single metal base may be welded to each other, thereby forming the first current collector 110a' having a 3-dimensional mesh structure. For example, first ends B1, B2 and B3 of the folded single metal base may be welded to each other and second ends B1', B2' and B3' of the folded single metal base may be welded to each other.

A wire forming the first current collector 110a or 110a' may have any suitable sectional shape, such as, for example, circular, rectangular, triangular, polygonal or striped shapes.

In addition, the first current collector 110a or 110a' may be configured in a combination of the types shown in FIGS. 1B and 1C.

The first current collector 110a or 110a' may include, for example, any suitable metallic material for forming a general positive current collector, such as aluminum.

As described above, the first current collector 110a or 110a' having a 3-dimensional mesh structure may be configured such that a plurality of metal bases each having a 2-dimensional mesh structure having a constant thickness are stacked in a juxtaposed manner or a single metal base having a 2-dimensional mesh structure is folded a one or more times, thereby achieving the 3-dimensional mesh structure having more uniformly distributed bases. Accordingly, the overall electric conductivity may become uniform throughout the first current collector 110a or 110a'. In addition, since the first current collector 110a has a 3-dimensional mesh structure, a thick film may be easily formed and the electrode plate formed of a thick film may have improved flexibility while having an improved electrolyte impregnating property, compared to a general porous current collector.

As shown in FIG. 1D, the first active material portion 120a may include an inserting portion 120a1, a top coating portion 120a2 and a bottom coating portion 120a3.

The inserting portion 120a1 is a portion formed by inserting part of a first active material into the inside of the first current collector 110a when the first active material is coated on the first current collector 110a. The first current collector 110a has a 3-dimensional mesh structure. Accordingly, a vacant space exists within the first current collector 110a. Therefore, when the first active material is coated on the first current collector 110a, part of the first active material may be inserted into the vacant space within the first current collector 110a. A portion of the first active material resulting from the inserting may form the inserting portion 120a1 of the first active material portion 120a.

The top coating portion 120a2 and the bottom coating portion 120a3 are portions formed by coating the first active material on top and bottom surfaces of the first current collector 110a each to a constant thickness without being further inserted into the inside of the first current collector 110a. As shown in FIG. 1D, the top coating portion 120a2 may have a thickness ta2 and the bottom coating portion 120a3 may have a thickness ta3. Here, values of the thicknesses ta2 and ta3 may be equal to each other in consideration of electric conductivity of the first electrode plate 100A. Considering that the first active material portion 120a may be inserted into the first current collector 110a, a thickness ta1 of the first current collector 110a may be appropriately 15 to 50% of a total thickness Ta of the first electrode plate 100A.

In order to improve the electrolyte impregnating performance of the first current collector 110a, an aluminum oxide portion may be formed on a surface of at least one of first metal bases forming the first current collector 110a. For example, the aluminum oxide portion may be formed on surfaces of all of the first metal bases. For example, referring to FIG. 1B, the aluminum oxide portion may be formed on all of the first metal bases 111a, 112a, 113a and 114a forming the first current collector 110a. The aluminum oxide portion may be formed by performing anodic aluminum oxide (AAO) template treatment on the first metal bases. In particular, the anodic aluminum oxide template treatment may be performed with respect to a first current collector 110a that forms a positive electrode plate in a secondary battery.

The aluminum oxide portion may have multiple pores having a hexagonal structure. The pores may be formed according to the mesh structure of the first metal base.

The pores may be formed to an average diameter in a range of approximately 50 to 100 nm, in consideration of active material particles having a diameter of several to several tens of micrometers (μm), ionic components made into a solvent in an electrolyte, and solvents having a diameter of several to several tens of angstroms (Å). The pores may have an appropriate diameter for allowing the ionic components made into a solvent in an electrolyte and solvents to penetrate into the pores while preventing the active material particles from penetrating into the pores.

Preferably, the pores may have an average depth in a range of about 1/500 to about 1/100 of a thickness of a wire forming the first metal base. For example, when the depth of the pore is 1/100 of the thickness of the wire, if the thickness of the wire is approximately 15 μm, the depth of the pore may be approximately 150 nm. Similarly, if the thickness of the wire is approximately 50 μm, the depth of the pore may be approximately 0.5 μm.

Figure 1E:
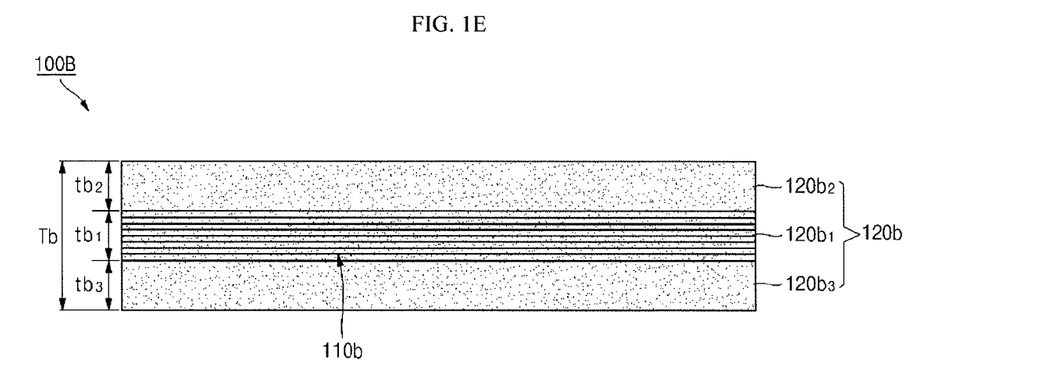
FIG. 1E illustrates a cross-sectional view of a second electrode plate according to the embodiment of FIG. 1A.

Next, a second electrode plate 100B will be described. In the illustrated embodiment, the second electrode plate may be a negative electrode plate.

FIG. 1E is a cross-sectional view of a second electrode plate 100B.

Referring to FIG. 1E, the second electrode plate 100B includes a second current collector 110b and a second active material portion 120b. Here, the second active material portion 120b may have an inserting portion 120b1, a top coating portion 120b2 and a bottom coating portion 120b3.

The second current collector 110b and the second active material portion 120b may have the same structures as the first current collector 110a and the first active material portion 120a. Therefore, a detailed description of the second electrode plate 100B will not be repeated. However, unlike the first electrode plate 100A, the second electrode plate 100B may be a negative electrode plate and may include a second current collector 110b and a second active material portion 120b having a negative electrode metal base and a negative active material. An aluminum oxide portion may be omitted in the second current collector 110b.

Hereinafter, a secondary battery according to an embodiment will be described. In the following description, the secondary battery according to this embodiment employs the first and second electrode plates 100A and 100B, by way of example. However, it is to be understood that in other implementations, the configuration of the secondary battery may differ from what is illustrated herein.

Figure 2:
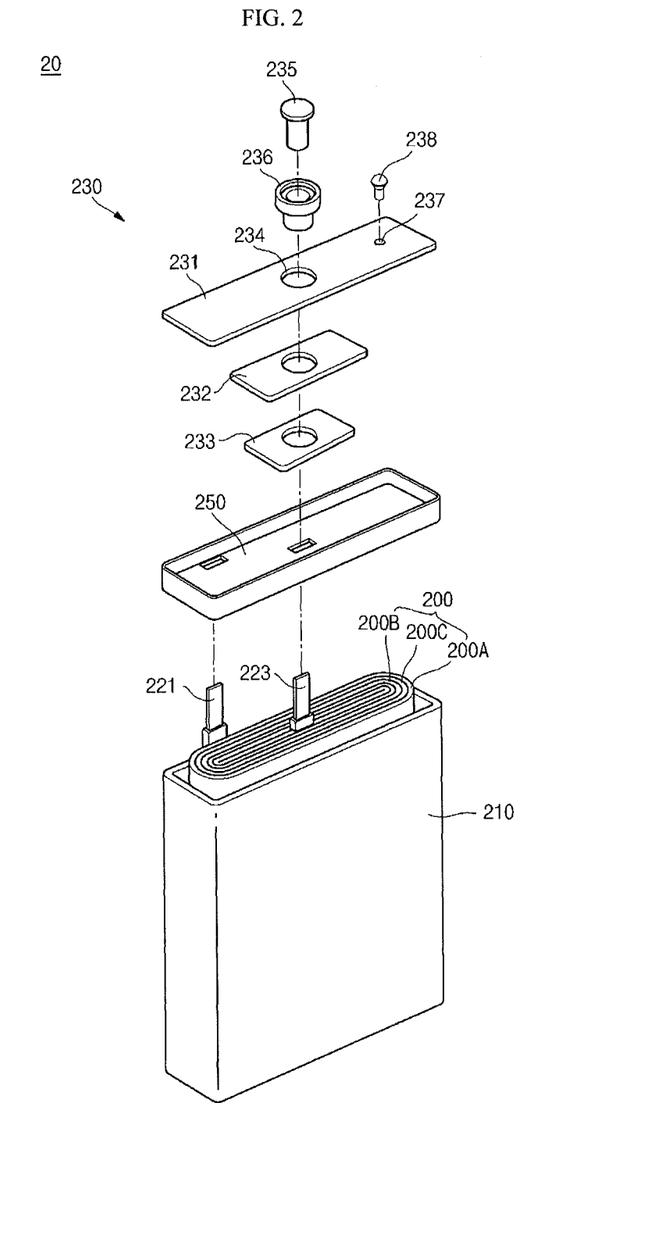
FIG. 2 illustrates an exploded perspective view of a secondary battery according to another embodiment.

FIG. 2 is an exploded perspective view of a secondary battery according to this embodiment.

As shown in FIG. 2, the secondary battery 20 may include an electrode assembly 200, a can 210 accommodating the electrode assembly 200, and a cap assembly 230 sealing an open top portion of the can 210.

The can 210 may be shaped as a square column having an opened top end and may be made of a metal. The can 210 itself may function as an electrode terminal.

The electrode assembly 200 may be configured such that a first electrode plate 200A, a second electrode plate 200B and a separator 200C are wound in a jelly-roll configuration. The first electrode plate 200A and the second electrode plate 200B may be the same as the first electrode plate 100A and the second electrode plate 100B, respectively, as described above, and detailed descriptions thereof will not be repeated.

A first electrode tab 221 and a second electrode tab 223 may be drawn from the first electrode plate 200A and the second electrode plate 200B toward an upper portion of the electrode assembly 200. The first electrode tab 221 and the second electrode tab 223 may be fixed to the first electrode plate 200A and the second electrode plate 200B, respectively, by welding.

The cap assembly 230 may be installed at the opened top end of the can 210. The cap assembly 230 may include a cap plate 231, an insulation plate 232 making a surface contact with a bottom surface of the cap plate 231 and a terminal plate 233 installed on a bottom surface of the insulation plate 232.

A terminal throughhole 234 may be formed at the center of the cap plate 231, and a second electrode terminal 235 penetrating into the can 210 may be installed in the terminal throughhole 234. A gasket 236 may be installed on the external surface of the second electrode terminal 235, thereby insulating the second electrode terminal 235 and the cap plate 231 from each other. The second electrode terminal 235 may be electrically connected to the terminal plate 233.

In addition, an insulation case 250 may further be installed on the electrode assembly 220 within the can 210.

An electrolyte injection hole 237 may be formed at one side of the cap plate 231 to allow an electrolyte to be inserted into the can 210, and the electrolyte injection hole 237 may be sealed with a plug 238.

Hereinafter, a manufacturing method for an electrode plate according to an embodiment will be described in detail with reference to the accompanying drawings.

Figure 3A:
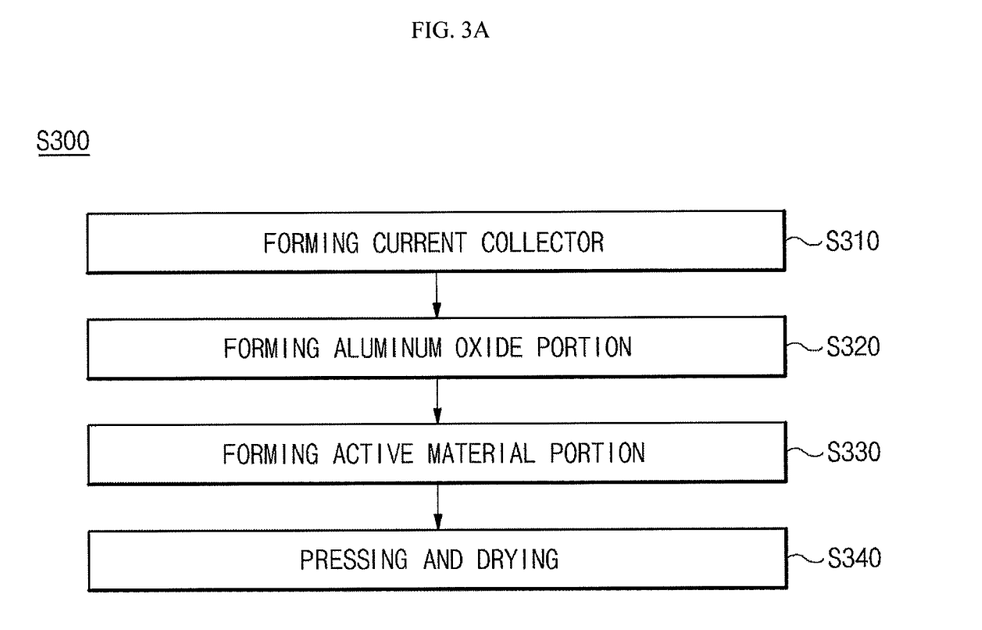
FIG. 3A illustrates a flowchart schematically illustrating a manufacturing method for an electrode plate according to another embodiment.
Figure 3B:
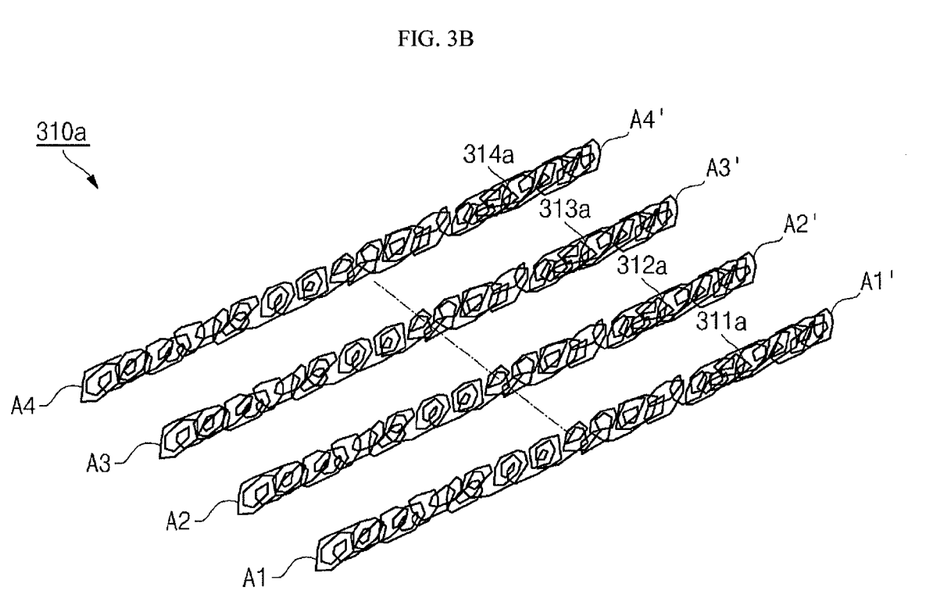
FIG. 3B illustrates an example of forming a first current collector according to the embodiment of FIG. 3A.
Figure 3C:
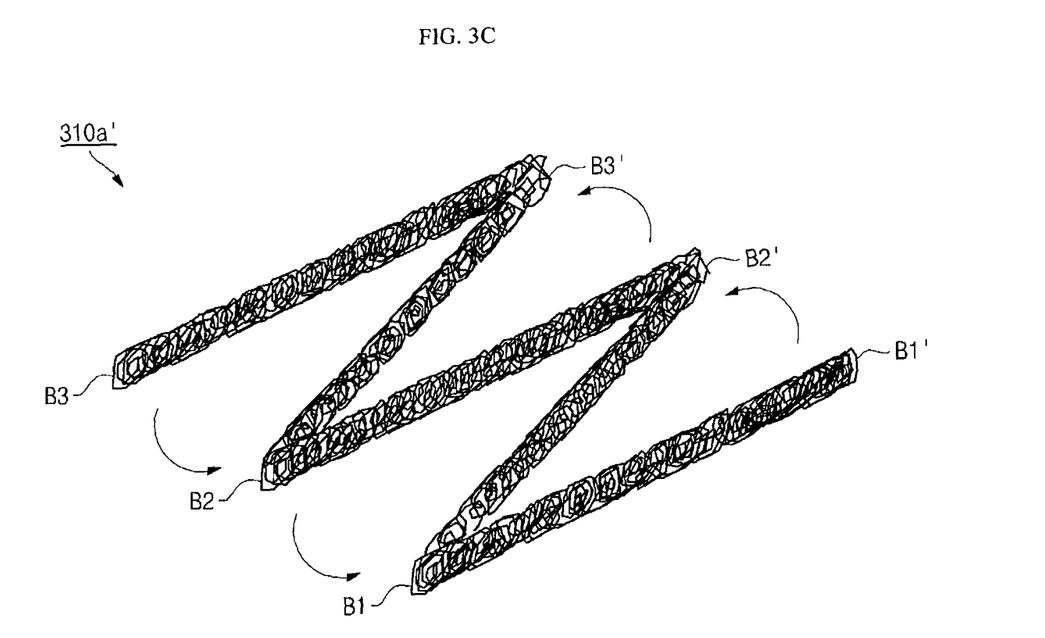
FIG. 3C illustrates another example of forming the first current collector according to the embodiment of FIG. 3A.
Figure 3D:
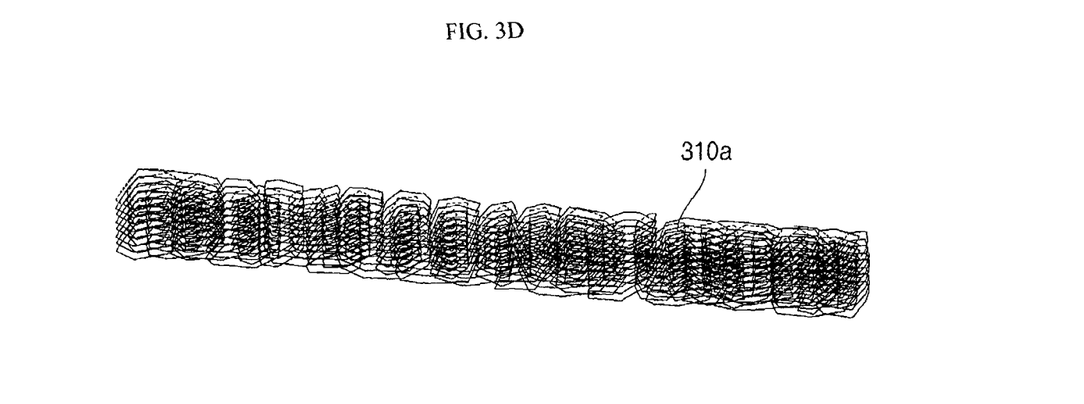
FIG. 3D illustrates a perspective view of the first current collector according to the embodiment of FIG. 3A.
Figure 3E:
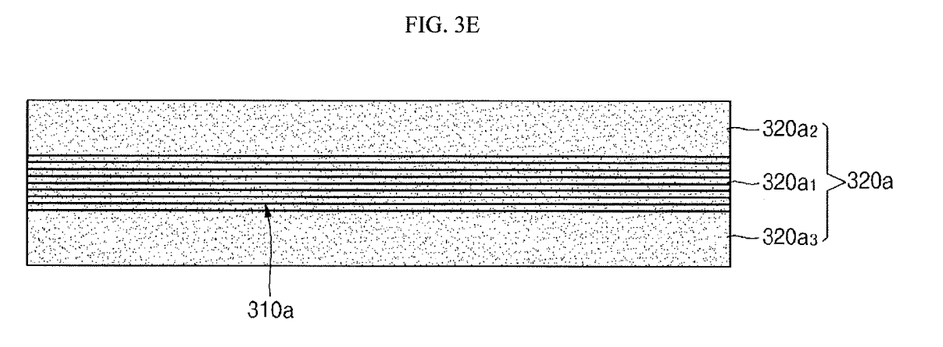
FIG. 3E illustrates a cross-sectional view illustrating the first current collector and a first active material portion according to the embodiment of FIG. 3A.
Figure 3F:
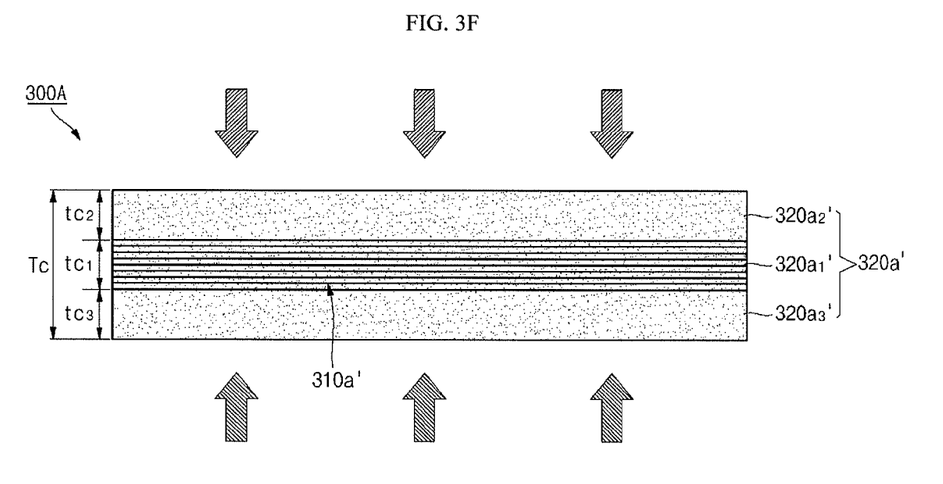
FIG. 3F illustrates a pressing process of a first electrode plate shown in FIG. 3E.

FIG. 3A is a flowchart schematically illustrating a manufacturing method for an electrode plate according to the embodiment. FIG. 3B illustrates an example of forming a first current collector 310a, FIG. 3C illustrates another example of forming the first current collector 310a, FIG. 3D is a perspective view of the first current collector 310a. FIG. 3E is a cross-sectional view illustrating the first current collector 310a and a first active material portion 320a. FIG. 3F illustrates a pressing process of the first electrode plate 300A shown in FIG. 3E.

Referring to FIGS. 3A to 3F, the manufacturing method S300 of the electrode plate according to the embodiment includes forming a current collector (S310), forming an aluminum oxide portion (S320), forming an active material portion (S330), and pressing and drying (S340)

The electrode plate may include a first electrode plate and a second electrode plate. A method for forming the first electrode plate will first be described. The first electrode plate may be a positive electrode plate and a second electrode plate may be a negative electrode plate.

In (S310), the first current collector 310a may be formed by at least one of two methods.

In a first implementation, as shown in FIG. 3B, the first current collector 310a having a 3-dimensional mesh structure may be formed by stacking first metal bases 311a, 312a, 313a and 314a, each having a 2-dimensional mesh structure, in a juxtaposed manner. Each of the first metal bases 311a, 312a, 313a and 314a may be a 2-dimensional thin film having thin and long wires intertwined in a mesh configuration. As shown in FIG. 3E, the first current collector 310a may be constructed to have a constant thickness such that the first metal bases 311a, 312a, 313a and 314a, each having a 2-dimensional mesh structure, are stacked in a juxtaposed manner. A thickness of each of the first metal bases 311a, 312a, 313a and 314a may be in a range of approximately 10 to 50 μm, as an example.

The first metal bases 311a, 312a, 313a and 314a may be coupled to each other by welding ends thereof corresponding to each other. For example, first ends A1, A2, A3 and A4 of the first metal bases 311a, 312a, 313a and 314a may be welded to each other, and second ends A1', A2', A3' and A4' of the first metal bases 311a, 312a, 313a and 314a may be welded to each other.

In another implementation, as shown in FIG. 3C, a first current collector 310a' may be configured such that a single metal base having a 2-dimensional mesh structure is folded one or more times. Ends of the folded metal base may be welded to each other, thereby forming the first current collector 310a' having a 3-dimensional mesh structure. For example, first ends B1, B2 and B3 of the folded metal base may be welded to each other and second ends B1', B2' and B3' of the folded metal base may be welded to each other.

A wire forming the first current collector 310a or 310a' may have any suitable sectional shape, including circular, rectangular, triangular, polygonal or striped shapes.

In addition, the first current collector 310a or 310a' may be configured in at least one or a combination of types shown in FIGS. 3B and 3C.

The first current collector 310a or 310a' may include, for example, any suitable metallic material for forming a general positive current collector, such as aluminum.

As described above, the first current collector 310a or 310a' having a 3-dimensional mesh structure may be configured such that a plurality of metal bases each having a 2-dimensional mesh structure having a constant thickness are stacked in a juxtaposed manner or a single metal base having a 2-dimensional mesh structure is folded a one or more times, thereby achieving the 3-dimensional mesh structure having more uniformly distributed bases. Accordingly, the overall electric conductivity may become uniform throughout the first current collector 310a or 310a'. In addition, since the first current collector 310a has a 3-dimensional mesh structure, a thick film may be easily formed, and the electrode plate formed of a thick film may have improved flexibility while having improved electrolyte impregnating property, compared to the general porous current collector.

In (S320), in order to improve the electrolyte impregnating performance of the first current collector 310a, an aluminum oxide portion may be formed on a surface of at least one of first metal bases forming the first current collector 310a. Preferably, the aluminum oxide portion may be formed on surfaces of all of the first metal bases. For example, referring to FIG. 3B, the aluminum oxide portion may be formed on all of the first metal bases 311a, 312a, 313a and 314a forming the first current collector 310a. The aluminum oxide portion may be formed by performing an anodic aluminum oxide (AAO) template treatment on the first metal bases. In particular, the anodic aluminum oxide template treatment may be performed with respect to a first current collector 110a that forms a positive electrode plate in a secondary battery.

The aluminum oxide portion may have multiple pores in a hexagonal pattern, and the pores may be formed according to the mesh structure of the first metal base.

As an example, the pores may be formed to a size in a range of approximately 50 to 100 nm, in consideration of active material particles having a diameter of several to several tens of micrometers (μm), ionic components made into a solvent in an electrolyte and solvents having a diameter of several to several tens of angstroms (Å). The pore may have an appropriate size for allowing the ionic components made into a solvent in an electrolyte and solvents to penetrate into the pores while preventing the active material particles from penetrating into the pores.

Preferably, the pores may have a depth in a range of about 1/500 to about 1/100 of a thickness of a wire forming the first metal base. For example, when the depth of the pore is 1/100 of the thickness of the wire, if the thickness of the wire is approximately 15 μm, the depth of the pore may be approximately 150 nm. Similarly, if the thickness of the wire is approximately 50 μm, the depth of the pore may be approximately 0.5 μm.

In (S330), as shown in FIG. 3E, a first active material portion 320a having an inserting portion 320a1, a top coating portion 320a2 and a bottom coating portion 320a3 may be formed by coating a first active material onto the first current collector 310a having a 3-dimensional mesh structure.

The inserting portion 320a1 is a portion formed by inserting part of the first active material into the inside of the first current collector 310a when the first active material is coated onto the first current collector 310a. The first current collector 310a has a 3-dimensional mesh structure. Accordingly, a vacant space exists within the first current collector 310a. Therefore, when the first active material is coated on the first current collector 310a, part of the first active material may be inserted into the vacant space within the first current collector 310a. A portion of the first active material resulting from the inserting may form the inserting portion 320a1 of the first active material portion 320a. The top coating portion 320a2 and the bottom coating portion 320a3 are portions formed by coating the first active material on top and bottom surfaces of the first current collector 310a, each to a constant thickness, without being further inserted into the inside of the first current collector 310a.

In (S340), a first current collector 310a' and a first active material portion 320a' are milled and dried, thereby forming the first electrode plate 300A, as shown in FIG. 3F. The top coating portion 320a2' of the first electrode plate 300A may have a thickness tc2 and the bottom coating portion 320a3' of the first electrode plate 300A may have a thickness tc3. Values of the thicknesses tc2 and tc3 may be equal to each other in consideration of electric conductivity of the first electrode plate 300A and may be adjusted to be minimized for the purpose of improving output power of the secondary battery In addition, considering that the first active material portion 320a' is inserted into the first current collector 310a, a thickness tc1 of the first current collector 310a' may be appropriately 15 to 50% of a total thickness Tc of the first electrode plate 300A.

The second electrode plate according to the third embodiment may be formed by substantially the same method as the first electrode plate 300A, except that the second electrode plate may not have an aluminum oxide portion. Therefore, in the method for forming the second electrode plate, the forming of the aluminum oxide portion (320S) may be omitted. In addition, the second electrode plate may be a negative electrode plate including a second current collector and a second active material portion formed of a negative electrode metal base and a negative active material, respectively.

By way of summation and review, a general current collector may have a 2-dimensional shape. When an electrode is formed as a thick film, electron conductivity may be lowered, making it difficult to achieve high performance. On the other hand, 3-dimensional bases may have rigid, porous structures. Once the rigid, porous base is fabricated into an electrode plate, the resulting electrode plate may be limited in terms of flexibility. Therefore, the development of technology for a 3-dimensional current collector capable of maintaining flexibility and the extending of technology into providing functional current collectors having combinations of new functions are desirable.

Embodiments disclosed herein may provide a thick film electrode plate having improved flexibility and an improved electrolyte impregnating property. In addition, a manufacturing method for the electrode plate may be provided.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. An electrode plate, comprising:
    a current collector, the current collector being made of metal and having a 3-dimensional mesh structure, wherein a surface of the current collector includes an aluminum oxide portion having pores; and
    an active material portion including an active material, the active material portion being inserted into a vacant space in the current collector and coated on top and bottom surfaces of the current collector.

2. The electrode plate of claim 1, wherein the current collector includes at least one selected from:
    a plurality of metal bases, each having a 2-dimensional mesh structure, the plurality of metal bases being stacked in a juxtaposed manner to provide the 3-dimensional mesh structure, and
    a single metal base having a 2-dimensional mesh structure that is folded one or more times to provide the 3-dimensional mesh structure.

3. The electrode plate of claim 2, wherein a surface of the single metal base or a surface of at least one of the plurality of metal bases includes the aluminum oxide portion having pores.

4. The electrode plate of claim 1, wherein an average diameter of the pores is in a range of 50 to 100 nm.

5. The electrode plate of claim 3, wherein an average depth of the pores is in a range of $1/500$ to $1/100$ of a thickness of the single metal base or the at least one of the plurality of metal bases.

6. The electrode plate of claim 1, wherein a thickness of the current collector is 15 to 50% of a total thickness of the electrode plate.

7. A secondary battery, comprising:
    a first electrode plate;
    a second electrode plate; and
    an electrolyte,
    wherein:
    the first electrode plate includes:
        a first current collector, the first current collector being made of metal and having a 3-dimensional mesh structure, wherein a surface of the first current collector includes an aluminum oxide portion having pores, and
        a first active material portion including an active material, the first active material portion being inserted into a vacant space in the first current collector and coated on top and bottom surfaces of the first current collector, and
    the second electrode plate includes:
        a second current collector, the second current collector being made of metal and having a 3-dimensional mesh structure, and
        a second active material portion including a second active material, the second active material portion being inserted into a vacant space in the second current collector and coated on top and bottom surfaces of the second current collector.

8. The secondary battery of claim 7, wherein each of the first current collector and the second current collector includes at least one selected from:
    a plurality of metal bases each having a 2-dimensional mesh structure, the plurality of metal bases being stacked in a juxtaposed manner, and
    a single metal base having a 2-dimensional mesh structure that is folded one or more times to provide the 3-dimensional mesh structure.

9. The secondary battery of claim 8, wherein a surface of the single metal base or a surface of at least one of the plurality of metal bases of the first current collector includes the aluminum oxide portion having pores.

10. The secondary battery of claim 7, wherein an average diameter of the pores is in a range of 50 to 100 nm.

11. The secondary battery of claim 9, wherein an average depth of the pores is in a range of $1/500$ to $1/100$ of a thickness of the single metal base or the at least one of the plurality of metal bases.

12. The secondary battery of claim 8, wherein:
    a thickness of the first current collector is 15 to 50% of a total thickness of the first electrode plate, and
    a thickness of the second current collector is 15 to 50% of a total thickness of the second electrode plate.

13. A method of manufacturing an electrode plate, the method comprising:
    forming a current collector, the current collector being made of metal and having a 3-dimensional mesh structure;
    performing an anodic aluminum oxide (AAO) template treatment on a surface of the current collector to form an aluminum oxide portion having pores on the surface of the current collector; and
    forming an active material portion including an active material, the active material portion being inserted into a vacant space in the current collector and coated on top and bottom surfaces of the current collector.

14. The method of claim 13, wherein the forming of the current collector includes at least one selected from:
    stacking a plurality of metal bases, each having a 2-dimensional mesh structure, in a juxtaposed manner to provide the 3-dimensional mesh structure, and
    folding a single metal base having a 2-dimensional mesh structure one or more times to provide the 3-dimensional mesh structure.

15. The method of claim 14, wherein the anodic aluminum oxide (AAO) template treatment is performed on a surface of the single metal base or the at least one of the plurality of metal bases of the current collector to form the aluminum oxide portion having pores, such that the pores have an average diameter in a range of 50 to 100 nm, and have an average depth in a range of $1/500$ to $1/100$ of a thickness of the single metal base or the at least one of the plurality of metal bases.

16. The method of claim 13, further comprising, pressing the electrode plate after the forming of the active material portion, wherein the pressing is performed to provide a thickness of the current collector of 15 to 50% of a total thickness of the electrode plate.

* * * * *